United States Patent [19]

Hachmann et al.

[11] Patent Number: 4,893,693

[45] Date of Patent: Jan. 16, 1990

[54] SAFETY ARRANGEMENT FOR FORK TRUCKS

[75] Inventors: Hans-Jürgen Hachmann, Elsmhorn; Siegfried Hoener, Hamburg, both of Fed. Rep. of Germany

[73] Assignee: Firma Jungheinrich Unternehmensverwaltung KG, Hamburg, Fed. Rep. of Germany

[21] Appl. No.: 245,826

[22] Filed: Sep. 16, 1988

[30] Foreign Application Priority Data

Sep. 29, 1987 [DE] Fed. Rep. of Germany ....... 3732724

[51] Int. Cl.$^4$ ............................ B60P 7/06; B60T 7/22
[52] U.S. Cl. ..................................... 180/275; 414/785
[58] Field of Search ............... 180/274, 275, 277, 278, 180/279, 280; 414/785, 629, 275, 674

[56] References Cited

U.S. PATENT DOCUMENTS

| 2,282,201 | 5/1942 | Neuman | 414/785 X |
|---|---|---|---|
| 3,599,744 | 8/1971 | Satterfield | 180/279 |
| 4,020,918 | 5/1977 | Houskamp et al. | 180/279 X |

FOREIGN PATENT DOCUMENTS

| 0168753 | 1/1986 | European Pat. Off. | |
| 0192940 | 9/1986 | European Pat. Off. | |
| 2904123 | 8/1979 | Fed. Rep. of Germany | 180/275 |
| 3219247 | 12/1982 | Fed. Rep. of Germany | |
| 3511139 | 10/1985 | Fed. Rep. of Germany | |
| 3501598 | 7/1986 | Fed. Rep. of Germany | |
| 3213957 | 4/1987 | Fed. Rep. of Germany | |
| 2116765 | 9/1983 | United Kingdom | |

Primary Examiner—John A. Pekar
Attorney, Agent, or Firm—Toren, McGeady & Associates

[57] ABSTRACT

A fork truck is provided with a collision-preventing safety arrangement which initiates an emergency stopping in response to a contact with or detection of an obstacle. That safety arrangement comprises a safety device which at least adjacent to a load carrier (3) encloses the space for accommodating a picked-up load (20) on a level within the height range of a human being. That safety device is designed to permit a handling of the load (20) by means of the load carrier (3) at least in a forward direction. For that purpose the safety device may comprise a confining structure, which in its operative position encloses at least the space adjacent to the load carrier (3) and is movable out of its operative position when a load (20) is to be handled.

16 Claims, 6 Drawing Sheets

SAFETY ARRANGEMENT FOR FORK TRUCKS

BACKGROUND OF THE INVENTION

1. Field of the Invention

This invention relates to a safety arrangement for fork trucks, comprising a collision preventer which initiates an emergency stopping in response to a contact with or detection of an obstacle.

2. Description of the Prior Art

In safety arrangements used, e.g., in conjunction with U-shaped bumpers on drawbar vehicles it is known to use a bumper which has such a compliance or displaceability that the spring excursion exceeds the stopping distance of the vehicle in the run-up direction even when the vehicle is loaded.

Such concept may be adopted in the present safety arrangement.

The term fork truck covers vehicles having fork blades which can be supported on the ground or floor by supporting rollers and can be moved under pallets and are movable in height only by a short distance to raise the load, as well as vehicles comprising a mast on which a load carrier, in most cases a load-carrying fork, is movable in height by means of a lifting carriage.

In that respect the term fork covers also other load-carrying members.

Various types of collision preventers are known. In that context it is emphasized that the invention is applicable to driver-controlled and to driverless vehicles. Vehicles of the latter type which are provided with carrying forks are usually operated in such a manner that the truck with the body and power unit moves ahead and the load is disposed or handled at the rear end. It is known to provide such trucks with safety arrangements for preventing collisions. In accordance with the concept outlined hereinbefore such safety arrangements are designed to stop the truck on a distance which is so short that the truck and an obstacle will not collide. In the design of an emergency stopping device the stopping distance of a vehicle which carries a load is also taken into account.

Such collision-preventing safety arrangements may comprise, e.g., in accordance with European Pat. No. 0 192 940, a confining structure, which can be deflected or compressed in several directions. In accordance with European Pat. No. 0 168 753 a truck which carries loads on its rear part may be connected in front of a safety car provided with a sensor for detecting obstacles. Upon contact with an obstacle, a pull-back device is operated to pull back the safety car against the front of the truck and to initiate the braking operation. Such an arrangement is expensive. Whereas it can be used to advantage for traveling around sharp bends, it does not permit a load-handling implement to be provided adjacent to such safety device.

In accordance with the publication mentioned last and, e.g., in accordance with Published German application No. 35 11 139, fork blades or loads are caused to trail in that they are provided at that end of the truck which is remote from the safety device. From that aspect the published German application which has been stated discloses an embodiment in which ultrasonic pulses are used.

In connection with the above-mentioned embodiment including a yieldable confirming structure, reference is also made to the prior art apparent from Published German application No. 32 19 247. In that case the safety arrangement comprises a mechanical shock absorber provided on a driverless truck. In a special embodiment that shock absorber comprises a compliant member and a pressure-responsive switching member. That shock absorber is also provided at the front end of the truck, which at that end does not have a special load carrier which serves to handle loads.

A specially designed collision-preventing stopping device of mechanical type is apparent from German patent specification No. 32 13 957. That device comprises a U-shaped contacting member, which is divided into sections and surrounds only a cavity and is adapted to be depressed into said cavity and is not operated in any relationship to a load carrier or to a load which has been picked up. In a special embodiment of that device, a deformation will initiate a braking but a lateral stability or the like will not be ensured.

A collision preventer may also be provided which uses infrared light. Reference is made in that connection to Published German application No. 35 01 598. In that case it is necessary to provide persons working in a plant with a transmitter, e.g., for infrared radiation, which is carried in a hip belt or on a helmet, and to provide the trucks with a receiver, which is tuned to the transmitter. Such a system is also expensive and is not reliable because there is no assurance that the protective device will always be worn.

From the large number of known designs it is apparent that it is a problem to prevent collisions of fork trucks, particularly of fork trucks having a front fork. The fact that the problem has not been solved thus far is believed to be due to the fact that the load is carried by the load carrier in front of the truck proper so that known collision preventers or the like which are disposed in front of the truck cannot operate reliably. It is also emphasized that the known safety arrangements using ultrasonics or infrared light are expensive and are subject to limitations from structural and space aspects.

From the aspects outline above, all known safety arrangements fulfill the required function but they are not related to a load which has been picked up so that their operation is not dependent on such load.

SUMMARY OF THE INVENTION

It is an object of the invention to provide a safety arrangement which is of the kind described first hereinbefore and which will be operative also when the truck is traveling with a picked-up load carried by a load carrier, particularly a load-carrying fork, which is disposed in front. Such safety arrangement should also be able to perform additional functions.

That object is accomplished in accordance with the invention that a safety device is provided that encloses the space for accommodating a picked-up load at least adjacent to one load carrier in an elevation within the height range of a human being and said safety device permits the load to be handled by means of the load carrier. The height range of a human being extends from the foot level to the head level. It is essential hat at least the space for accommodating a picked-up load and, during travel, such load itself, is enclosed. This was not known before. When there is no picked-up load, the safety device enclosing said space will protect the region of the load carrier so that a fork truck will be protected against collision as it travels forwardly with the fork in front.

From that aspect the invention relates to a truck which is provided at its front end with a load-carrying fork. Special features reside in that the safety device in operative condition is adapted to be closed in front of the load in the direction of travel of the vehicle. The statement that the safety device is "adapted to be closed" means that the safety device may selectively be opened in front of the load so that a load can be handled in a forward direction or in front of the vehicle, bey a proper control of the operative subassemblies, when the truck is at a standstill or traveling slowly.

The safety device desirably comprises side bars, which are disposed laterally of the load. Such a safety device has a mechanical structure on its sides so that it can perform additional load-guiding functions. But in such an embodiment the possibility of a handling in a forward direction or in front is preserved.

In a particularly desirable embodiment the safety device consists of a confining structure, which in an operative position encloses at least the space adjacent to the load carrier and which can be moved out of its operative position when a load is to be handled. A confining structure may mechanically enclose the space at least around a load carrier that has been picked up, e.g., the space above the load carrier along the length and width thereof, so that a perfect protection against collisions will be ensured.

To permit a handling of the load, the confining structure is preferably pivoted to the truck and its frame portion which is remote from the main structure of the truck can be swung up to extend above the highest possible load which can be picked up. That concept will permit a simple design and can be economically adopted even in conjunction with a truck having a relatively small body. In that context, embodiments are also included in which transverse front bars can be swung up to a larger elevation even if the confining structure in operative position is relatively low and has a horizontal orientation.

In a desirable embodiment, the confining structure comprises pivotally movable side bars or is adapted to be closed in front of a load and the side bars are L-shaped so that a shorter arm of such side bar is provided at the pivotal mounting and that the front bar can be raised to a higher elevation over a load. This feature will result in a mechanical improvement.

In another suitable embodiment, the side bars are substantially Y-shaped and comprise a lower supporting arm which is engageable with the truck body and is optionally adapted to actuate a switch that is included in the functional link, whereas an upper arm of the side bar is pivoted and when it is initially in a downwardly inclined position the safety device can be raised over a load to a substantial elevation even when the side bars or the confining structure are or is relatively short.

This will be desirable because a stop switch may be provided for a function control and the structure will have small dimensions so that it will be compact and have a high stability.

The safety device may comprise side bars, which preferably extend from the truck body and parallel to the direction of the load carrier, particularly its fork blades, and are laterally outwardly spaced form the load carrier and extend forwardly beyond a picked-up load. In that case the safety device comprising a confining structure may be closed when a load has been picked up.

In a desirable embodiment the side bars may also be pivoted, preferably for a movement in a vertical plane, although a pivotal movement in horizontal planes is not excluded in special cases. This my be desirable if groups of loads are to be approached by the trucks and physical barriers are to be provided in front of such groups.

Whereas a pivotal movement has been referred to hereinbefore, in accordance with the remarks made hereinbefore the fork trucks may be provided with a lifting frame and a load-carrying carriage. But even if a load-carrying carriage is not provided but only fork blades are provided which are supported by rollers which are movable in height, the truck may comprise a lifting frame and the safety device, particularly side bars of a safety device, may be mounted on a lifting carriage, which is adapted to be raised along a lifting frame of the lift truck from the region which contains a load which is in a lower position, particularly in a transport position.

In that case, in dependence on the purpose for which the truck provided with the safety arrangement is used, that safety device may have a desirable elevation in its operative position. In that case the safety device in its operative position may horizontally enclose also parts of the truck. This will particularly be desirable if the safety device is pivoted or if rigid side bars are fixedly or movably mounted on the rear part of the truck body whereas the load-carrying part is designed to travel ahead and to constitute the forward end of the truck.

In all embodiments, mechanical bars of the safety device, inclusive of the front bar or bars of a confining structure are desirably provided with contact strips, such as foam bumpers, which have a compliance that is sufficient for effecting an emergency stopping of the truck before a person is endangered.

Reference made to a confining structure basically covers a rectangular structure conforming to the loads which will primarily be handled, inclusive of stacks on pallets. But such confining structures may alternatively be oval or rounded, particularly if the truck is to be used to transport similar shapes, such as bales, barrels or the like.

In its preferred embodiment, the confining structure will afford special advantages. The confining structure which constitutes the safety device my be yieldably deformable and may be depressed as far as to the space for accommodating the load. Known designs may be used for that purpose.

For adaptation to special conditions, telescopically extensible and retractable side bars will be preferred, particularly in confining structures.

It will be apparent from the foregoing that the space for the load or the load itself is at least laterally enclosed. This accomplished by a specially designed safety device. Besides, the advantage is afforded that the load-containing space is at least laterally confined so that the load in transport position will be protected.

If the safety device consists of a confining structure, a protection in a forward direction will also be ensured. In accordance with what has been stated hereinbefore the confining structure can be moved to its collosion-preventing and load-protecting position when the load has been picked up. In that case the surprising result will be produced that an effective protection against a collision will be ensured when a load is moved ahead of the traveling vehicle but the same means will also protect the load so that the truck will be permitted to travel at higher speed.

There is suitably a functional link between the safety device, which may consist of a confixing structure or may comprise side bars and/or a front bar, on the one hand, and the travel drive means of the truck, on the other hand, and circuitry is suitably provided for disabling the travel drive when the safety device is in its inoperative position.

In a special embodiment the disabling of the travel drive will result in a highly restricted condition but the circuitry may alternatively cause the travel drive to operate at a reduced speed unless the safety device is in its operative position.

DETAILED DESCRIPTION OF THE DRAWING

DETAILED DESCRIPTION OF THE PREFERRED EMBODIMENTS

Figure 1:
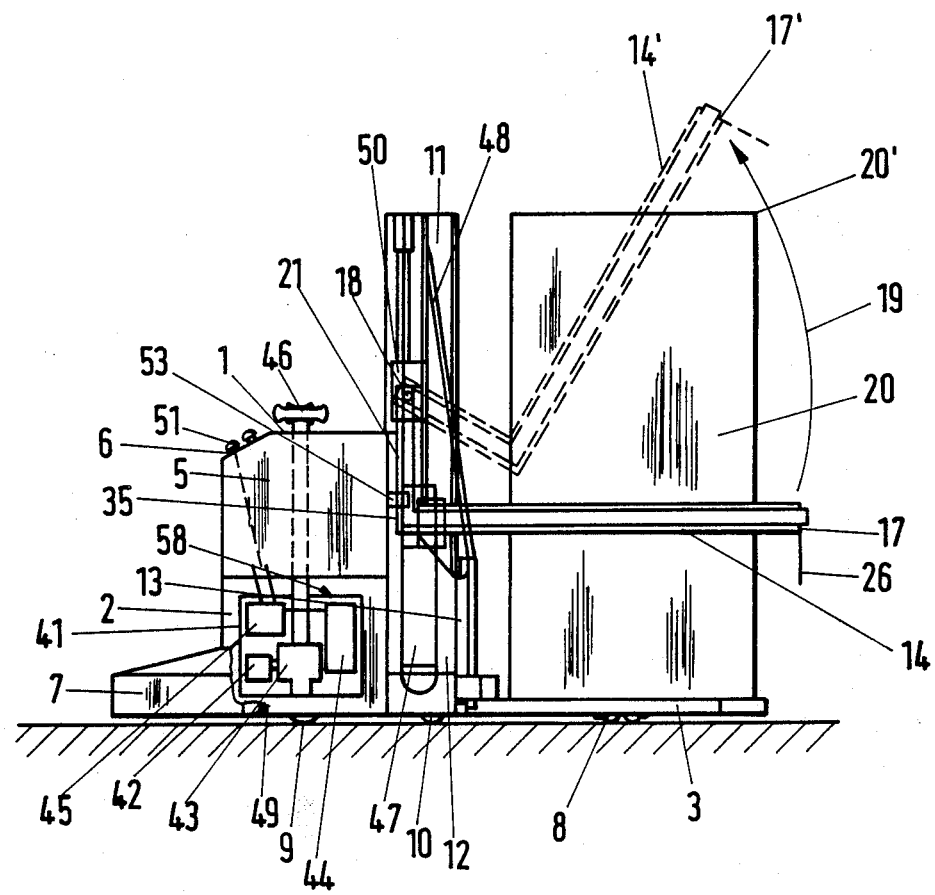
FIG. 1 is a side elevation showing a truck provided with a special safety device that is shown in operative position and, in dotted lines in an inoperative position.

Illustrative embodiments of the invention will now be described more in detail with reference to the drawing.

In all figures, a truck, particularly a driverless truck 1, is shown. In the embodiments shown by way of example that truck has a truck body 2 at one end and is provided at its other end with load-carrying fork blades 3, 4. The body 2 of the truck contains a control pedestal 5 including a panel 6 for entering command inputs and in lower portion of the body 2 accommodates a housing 58 for energy sources 42, such as batteries, and for drive motors 43, pump means and hydraulic fluid sources 44, i.e. the means for effecting the movements which are required on the truck. A control circuitry 45 connected to the control pedestal 5 is also contained in the housing 58. The control pedestal is also provided with a steering wheel 46 for effecting an auxiliary steering operation in case of need. As is formally illustrated the truck is provided with downwardly facing sensors 49 for causing the driverless truck to travel along a course-defining wire. At that end of the body 2 which is remote from the load-carrying fork blades 3, 4 the body 2 is provided with a bumper 7, which is shown only in outline.

Supporting rollers or sets of supporting rollers 8 are provided under the load-carrying fork blades 3, 4 and support said fork blades as they move over the floor or ground. The truck body 2 is provided with at least one steerable drive wheel 9, which is suitably disposed on the center line of the truck, and supporting rollers or wheels 10, which are laterally provided approximately in the plane of a lifting frame 11 close to the sides of the body 2.

The truck is so designed that in a lower position in which the supporting rollers 8 are raised to contact the fork blades 3, 4 or are retracted the fork blades 3, 4 can be moved under a load or into a pallet, whereafter the load-carrying fork blades 3, 4 can be raised and the supporting rollers 8 can be extended downwardly or swung down so that the load or pallet will be lifted.

Drive means of the kind disclosed, e.g., in British patent specification No. 649,625 are provided for the supporting rollers or wheels 8.

The load-carrying fork blades 3, 4 are movably mounted and guided in the plane of the lifting frame 11 in a portion 12 of the truck body. The same portion accommodates also drive means, such as cylinder-piston devices for moving those ends of the load-carrying fork arms 3, 4 which are close to the vehicle.

The load-carrying fork blades 3, 4 may be mounted on a fork-carrying carriage 13, which is adapted to be raised along the lifting frame by drive means known per se, which consist of a hydraulic cylinder-piston device 47 and a chain drive 48, such as are shown in FIG. 1 of U.S. Pat. No. 4,506,764.

Such trucks are known in various designs. The special truck which is described here differs from the known trucks in that a load-carrying fork provided with supporting rollers can be moved up and down along a lifting frame 11 although an operation as a low-lift fork truck may also be performed in which loads are only slightly lifted and transported above their supporting surface.

Such a vehicle may be provided with a driver's seat. The described truck is designed to operate without a driver and is adapted to travel along a course-defining element which has been installed in the floor or ground. The truck is provided with sensors for receiving signals from the course-defining element. When such a truck is traveling to the left in FIG. 1, the bumper 7 will be sufficient as a safety device particularly in case of obstacles having only a small height above the floor or ground. But such trucks will not be protected at all when, as has been explained hereinbefore, they travel with the load carrier or load-carrying fork blades 3, 4 in front. No protection has been known before for that mode of operation because the tips of the load-carrying fork blades will be used to pick up the load and lateral impacts or contacts with the load carrier may occur also as the vehicle is traveling, particularly if the load-carrying fork blades 3, 4 have been replaced by a transversely extensible load carrier, which may also be used within the scope of the invention.

In view of the object stated hereinbefore a protection at least in a forward direction, i.e., toward the tips of the load-carrying fork blades, is ensured by a special safety device consisting of a confining structure 14. That confining structure comprises side bars 15, 16 and a front bar 17 connecting said side bars. The side bars are pivoted to the body of the truck, e.g., also to a part of the lifting frame 11, for a pivotal movement on a transverse shaft 18, which is operatively connected to a swinging drive 50 for pivotally raising the confining structure 14 in the direction indicated by the arrow 19 to an upper position indicated by broken lines at 14'.

The operation of said swinging drive 50 when the vehicle is at a standstill is controlled by control levers 51, which are provided on the panel 6 and connected to the control circuitry 45.

Figure 2:
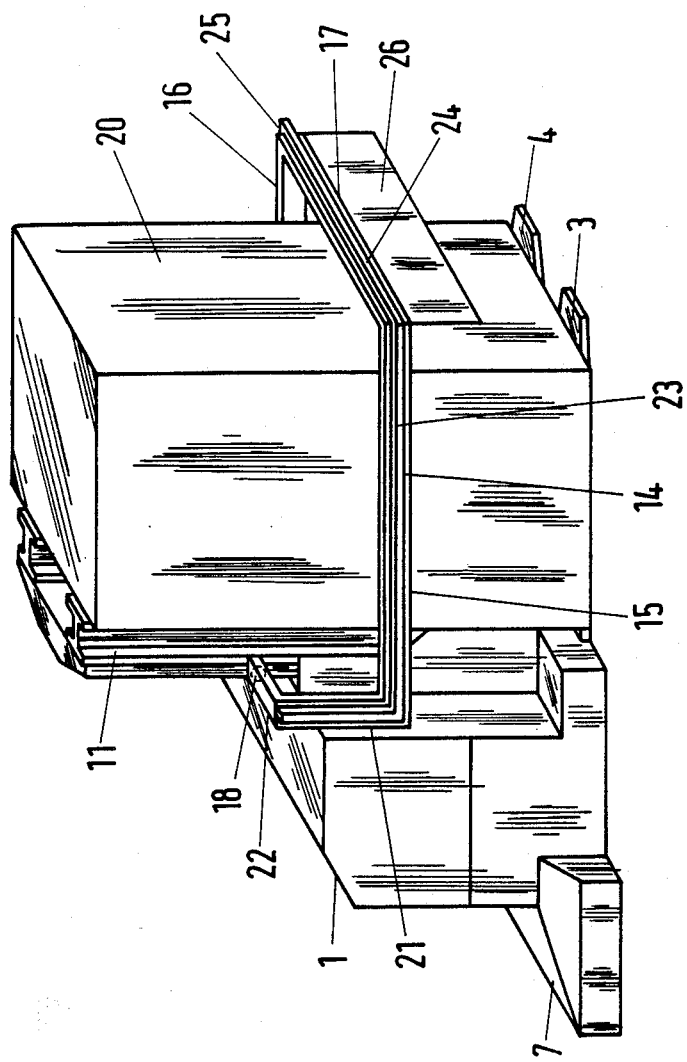
FIG. 2 is a diagrammatic perspective view showing the truck of FIG. 1 seen in an inclined direction on its front end with the safety device in operative position and the wheels being concealed.

By means of the swinging drive 50 the confining structure 14 is moved between two positions. In the position shown in FIGS. 1 and 2 the space over the load-carrying fork arms is confined and protected by the confining structure. In the other position that space is rendered accessible for a load 20 which is to be picked up or released. The load 20 shown in FIGS. 1 and 2 is the load which has the largest dimensions which are contemplated. In that case the means for pivotally mounting the confining structure, particularly the transverse shaft 18, are so arranged that the front bar 17 is freely pivotally movable above a top corner 20' of the load 20 in order to expose the space over the load-carrying fork blades 3, 4 in a forward direction, i.e., toward the load-carrying fork arms, whereas the lateral position of the side bars 15, 16 will not be changed.

From this aspect it will be desirable to provide L-shaped side bars 15, 16, which will have arms 21 which in operative position are parallel to the lifting frame 11 and are connected at their top ends to the transverse shaft 18. In that case the side bars 15, 16 are outwardly offset and are provided at the upper ends of the arms 21 with coupling members 22, which extend inwardly substantially parallel to the end bar 17 and are non-rotatably connected to the transverse shaft 18 or constitute parts of the transverse shaft 18. In that design it is taken into account that the lifting frame 11 is inwardly offset from the outer contours of a truck body and that the side bars of the confining structure 14 which constitute the safety device must be sufficiently offset in an outwardly direction to permit even relatively wide loads 20 freely to be picked up or deposited.

In the initial position which is shown the confining structure 14 constitutes a collision-preventing safety device that is desirably disposed on the chest level of a human being. The side bars 15, 16 as well as the front bar 17 are provided with contact strips 23, 24, 25, which may consist of foam bumpers. In response to a contact, said contact strips initiate a stopping of the truck or a travel of the truck at a creep speed so that the vehicle will finally stop before an obstacle is contacted by fixed parts of the truck or by the load.

For this purpose a skirt 26 is provided, which is disposed below the front bar 17 and which in response to a contact or deflection initiates a suitable control of the travel drive.

The embodiment shown in FIGS. 1 and 2 having L-shaped side bars 15, 16 is particularly desirable because a relative short confining structure 14 may be swung up even above a relatively high load 20 so that the same is forwardly released.

The embodiment shown in FIGS. 1 and 2 is structurally simple and requires only a relatively low lifting frame or only an extension thereof as a mounting structure because the front bar 17 can be swung up from its protecting position. Where a lifting frame is used which has the illustrated shape and which particularly extends above the top of the load 20, the confining structure 14 may be mounted on an associated carriage so that its mounting means, particularly the transverse shaft 18, can be raised along the lifting frame. That feature may be adopted in order to provide clearance spaces and to permit the use of short side bars.

Figure 3:
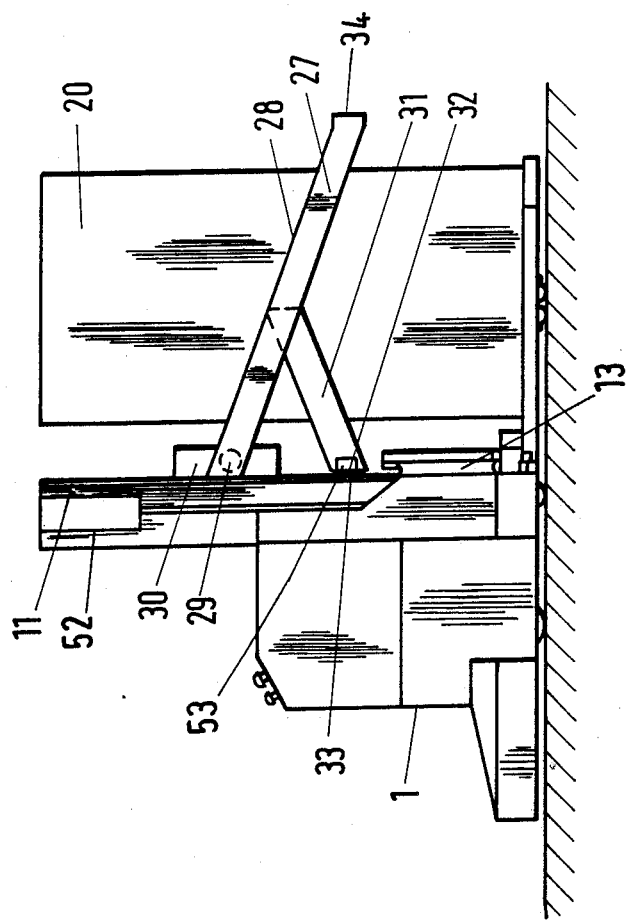
FIG. 3 is a side elevation which is similar to FIG. 1 and provided with a different embodiment of the safety device.

FIG. 3 illustrates a corresponding embodiment, which differs in that a confining structure 27 comprises side bars 28, which are pivoted at 29 to a subassembly 30, which may be constituted by a carriage that is movably mounted on the lifting frame 11. A supporting arm 31 is extending downwardly at an angle from each side bar approximately in the middle thereof and comprises an abutment 32 and defines for the confining structure 27 the operative position which is shown in FIG. 3. In that embodiment the transverse shaft 18 is operatively connected at 29 to a swinging drive, as has been described with reference to FIGS. 1 and 2. Besides, pressure-responsive switches may be provided at the point 33 which is engaged by the abutment 32. By said switches the safety arrangement will be enabled as soon as the confining structure 27 has reached its operative position.

In case of a pivoted confining structure the drive 50 will consist of a swinging drive as shown in FIG. 1.

If the subassembly 30 consists of a carriage which is guided on the lifting frame so that the confining structure 27 is adjustable in height, a hydraulic actuator 52 consisting of a cylinder-piston device may be provided, e.g., at the top edge of the lifting frame 11 and may be operated to move that carriage directly or, if desired, by means of chains trained around sprockets.

For instance, switching means 53 may be provided on the abutment 32, which is engageable with the counter-abutment 33. The switching means 53 may consist of a pressure-responsive switch, which will not permit the truck to travel unless the safety device is operative and which will disable the travel drive when the safety device has been raised to expose the load 20.

In this embodiment there is also a front bar 34.

The embodiment shown in FIG. 3 has the same advantage as the embodiment shown in FIGS. 1 and 2 that the pivotal mounting 29 is disposed above the level of the front bar 34 in its operative position so that the turning radius for the movement relative to the load 20 will extend from an elevated point, as is also the case in the different design shown in FIGS. 1 and 2. The actuating switches for enabling the safety arrangement may be provided between the location 33 and the abutment 32 and may alternatively be provided at 35 in FIG. 1 at the apex of the side bars of the confining structure 14.

In other respects, the remarks made in connection with FIGS. 1 and 2 are also applicable to FIG. 3.

Figure 4:
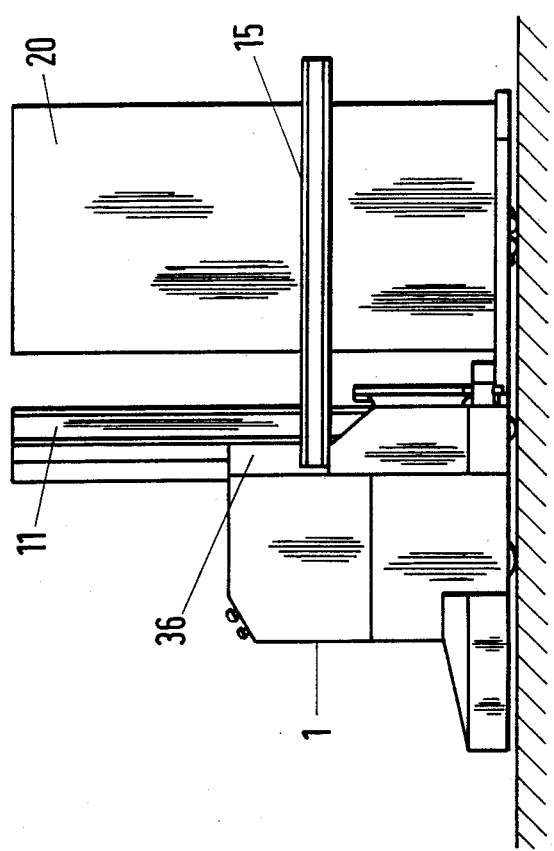
FIG. 4 is a side elevation which is similar to FIG. 1 and shows a modified safety arrangement.

The embodiment shown in FIG. 4 comprises parts which are used also in the embodiments shown in FIGS. 1 to 3, inclusive of side bar 15 (FIG. 2).

It is clearly shown in FIG. 4 that the side bars 15 (16) are provided with coupling members 22 such as are shown in FIG. 3 and said coupling members, which are parallel to the transverse axis of the truck, are mounted in a carriage 36, which is movable along the lifting frame 11. The carriage 36 is connected to drive means 52 such as are diagrammatically indicated for the carriage 36 in FIG. 3.

Figure 6:
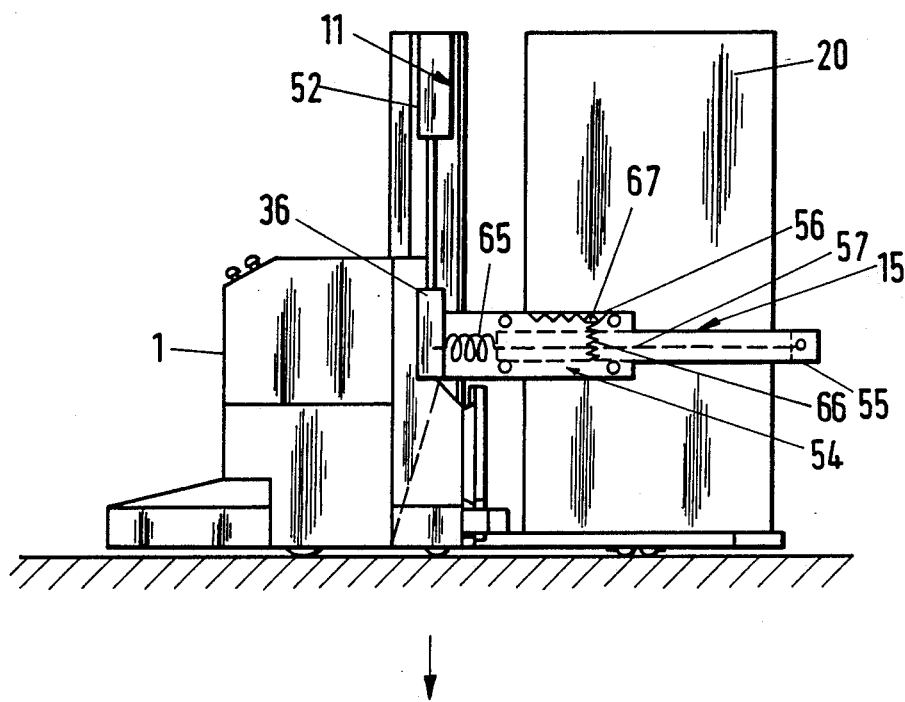
FIG. 6 is a side elevation which is similar to FIG. 4 and serves for an explanation of a special embodiment.

A special feature is illustrated in FIG. 6 and resides in that the side bars 15, 16 are telescopically extensible and retractable so that they are adapted to confine loads 20 having different lengths along the center line of the truck 1. Telescopic side bars comprise sections which are slidable on each other.

For connection to special locking or closure means provided at the ends of the side bars 15, 16, a connecting lead 57 may be provided for feeding electrically operable parts.

Such a connecting lead is flexible and at its inner end, e.g., near the carriage 36, consists of a coil 65, which permits a readjustment.

The detent means indicated at 56 may be constituted by a serrated cam and a detent member 67 may be provided on the arm 55 and may be resiliently urged against said cam by a compression spring 66.

As a result, the length of the side bar can be adjusted against the force of the spring 66 or said means may be used to inherently adjust the side bars 15 to a certain length. That increase in length will be taken up by the coil 65.

All said sections are provided with contact strips having wiper contacts in contact with each other!

FIG. 6 shows a telescopic side bar 15, which like the other side bar 16 comprises an arm 54 which is mounted on the carriage 36. An extensible arm 55 of the side bar 15 extends and is guided in an opening of the arm 54. The two arms are guided on each other by guide means such as rollers or slideways. Detent means which are diagrammatically indicated at 56 are provided between the two arms and releasably define a predetermined relative position.

It will be understood that in the embodiment shown in FIGS. 1 and 2 the side bars 15, 16 may also be telescopically extensible and retractable to confine different spaces around a load 20 and from a special aspect to confine such a load-containing space at an adequate distance from the load 20 and to provide an additional free space in the raised position 14' shown in FIG. 1. Telescopic side bars may also be used in the embodiment shown in FIG. 3.

Where telescopic side bars are provided, those parts of the side bars which are connected to their pivotal mountings may accommodate special drive means for extending telescopically extensible outer side bar parts. Such drive means may consist of a hydraulic or pneumatic cylinder-piston device or may consist of an electric motor which drives a nut for imparting an axial movement to a screw which is screwed into such nut and which is connected to the outer end of the side bar.

Figure 5:
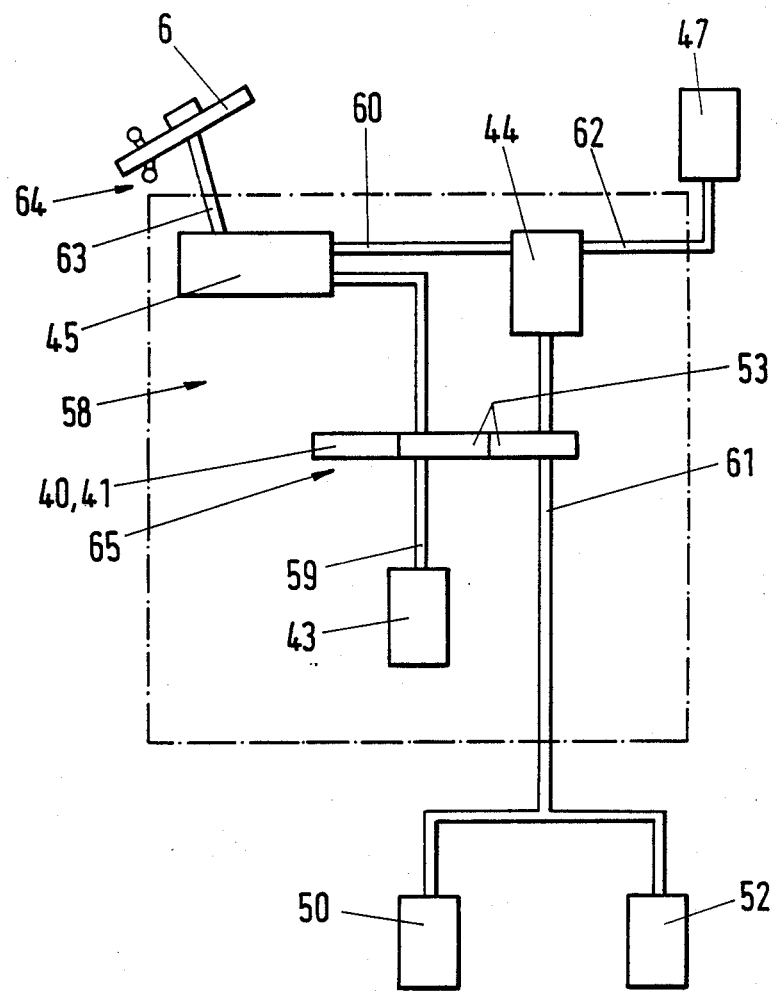
FIG. 5 is a functional diagram for an explanation of functional connections.

FIG. 5 shows the housing 58 with the control circuitry 45, the drive motor 43, the pump means and the sources 44 for the hydraulic drive. ON-OFF switches 64 are diagrammatically shown, which are provided in the usual manner. The leads to the control circuitry 45 comprise a functional line 59 leading to the drive motor 43 and the functional line 60 leading to the pump means and the sources 44.

Functional lines 61 extend from the subassembly 44 to drive means or swinging drive 50 and to the hydraulic drive 52 for the carriage of the safety device. Other functional lines 62 lead to the hydraulic cylinder-piston device 47 for activating a lifting carriage. The functional lines 59 and 61 include switching means 65 which are constituted by the switching means 53, the state of which depends on the position of the pivoted safety device. A further switch may be provided, which has a state that depends on the position of the subassembly 30 if it consists of a carriage and serves to enable the functional lines 59, 61 in alternation so that the truck will be disabled when the safety device is inoperative. Such mutually interlocking switches may alternatively be actuated in dependence on the energized or de-energized condition of the drive motor 43.

Via further functional lines 63 the control circuitry 45 is connected to the panel 6 and to control levers mounted thereon so that the drive means of the truck can be turned on and off by such levers and other conventional functions can be performed in the truck. Such functions include the actuation of the hydraulic cylinder-piston device 47, which can be actuated independently of the operation of the safety device.

In all embodiments shown and described, each of the side bars 15, 16, 28 and the front bar 17 or 34 is disposed in an elevation within the height range of a human being.

We claim:

1. A collision-preventing safety arrangement for load-carrying trucks comprising a truck body (2) and a load carrier (3, 4), which is provided at one end of the truck body and is closely spaced above the ground at least when the truck is travelling with a load (20) carried by the load carrier, wherein
    said truck body comprises a control pedestal (5) including control means (6) and is provided with a steerable drive wheel (9) and laterally disposed supporting rollers or wheels (10),
    said truck body contains energy sources, a travel drive as well as a control circuitry,
    a safety device is provided, which in response to a contact with or detection of an obstacle initiates an emergency stopping of the travel drive motor, and the improvement resides in that
    said safety device at least adjacent to said load carrier (3, 4) confines a space which is adapted to contain a load that is carried by the load carrier,
    said safety device comprises laterally immovable side bars (15, 16, 28),
    said safety device is provided in an elevation within the height range of a human being,
    said safety device in an operative position is adapted to retain in said space the load that is carried by the load carrier,
    said safety device is arranged to be raised from the operative position in the space containing the load, said safety device permits the load on the load carrier (3, 4) to be moved and handled by means of the load carrier at least toward an end thereof remote from the truck body (2), and
    a functional link between the safety device and the travel drive is provided as well as circuitry for disabling the travel drive when the safety device has been raised.

2. A safety arrangement according to claim 1 wherein said truck body (2) is provided at one end with a fork truck provided with a load-carrying fork extending in the direction of travel, wherein
    said safety device is arranged to be closed in front of the load (2) in the direction of travel of the truck (1) when said safety device is in its operative position.

3. A safety arrangement according to claim 1, wherein
    said side bars are included in a confining structure (14), which in its operative position confines said space at least adjacent to the load carrier (3, 4) and
    said safety device is operable to move said confining structure from its operative position to an inoperative position in which said confining structure exposes a load (20) on said load carrier so that said load can be handled.

4. A safety arrangement according to claim 3, wherein
    said confining structure (14) is mounted by means of a transverse shaft (18) and a pivotal mounting (29),
    said confining structure comprises a frame member which is remote from the body (2) of the vehicle and is adapted to be pivotally raised over the highest possible load (20) that is carried by the load carrier.

5. A safety arrangement according to claim 3, wherein
    said side bars a re pivotally movable and
    said side bars are L-shaped and include each a short arm (21), said frame member (17) constitutes an end bar which is carried by said short arms, a connector (22) that is nonrotatably connected to said transverse shaft (18) is provided at that end of said short arm which is remote from said long arm, and said confining structure is pivotally movable to a position in which said end bar (17) is disposed above the top of the highest load to be carried by said load carrier.

6. A safety arrangement according to claim 1, wherein said side bars are pivotally movable and said side bars are L-shaped and include each a short arm (21) and a pivoted long arm which is pivotally movable to raise said short arm to a higher elevation.

7. A safety arrangement according to claim 1, wherein said side bars (28) are substantially Y-shaped, each side bar (28) comprises an upper arm, which is pivoted to a pivotal mounting, and a supporting arm (31), which is rigid with and angled from said upper arm and at its end that is remote from said upper arm is provided with an abutment (32), said truck body is provided with a counter-abutment (33) for cooperating with said abutment (32), switching means are provided between said abutment (32) and counterabutment (33) and are operable in response to the contact between the abutment (32) and the counterabutment, said upper arm of said side bar is arranged to be downwardly inclined when said abutment (32) contacts said counterabument (33), said pivotal mounting (29) is mounted in said truck body on a level which is above said free ends of said side bars (28) when said abutment (32) contacts said counterabutment (33) so that said upper arms are adapted to be raised above the top of the highest load to be carried by said load carrier.

8. A safety arrangement according to claim 7, wherein said safety device comprises a confining structure, which includes said side bars and an end bar carrier by said upper arms at their free ends.

9. A safety arrangement according to claim 1, wherein said safety device comprises side bars (15, 16, 28), which are mounted on and extend forwardly from the truck body (2) beyond a load (20) that is carried by said load carrier and are laterally outwardly offset from said load carrier.

10. A safety arrangement according to claim 1, wherein said load carrier comprises fork blades and said side bars extend parallel to said fork blades.

11. A safety arrangement according to claim 1, wherein said truck comprises a lifting frame (11) and a lifting carriage (36), which is vertically movable along said lifting frame, said safety device and particularly its side bars (15, 16, 28) are mounted on said lifting carriage (36), and a lifting drive (52) is operatively connected to said lifting carriage (36) and is operable to raise the safety device out of the region of a load (20), which is carried by the load carrier in a lower position, particularly in a transport position.

12. A safety arrangement according to claim 1, wherein said side bars (15, 16, 28) are mechanically acting and an optional, mechanically acting front bar are provided with yieldable contact strips (23 to 25) consisting of foam bumpers which are yieldable to actuate a switch for effecting an emergency stopping of the truck (1).

13. A safety arrangement according to claim 1, wherein said safety device consists of a yieldable deformable confining structure, which is adapted to be depressed as far as to the space for accommodating the load (20).

14. A safety arrangement according to claim 1, wherein said side bars are telescopically extensible and retractable.

15. A safety arrangement according to claim 1, wherein each of said side bars (15, 16, 28) and a front bar (17, 34) is disposed in an elevation within the height range of a human being.

16. A safety arrangement according to claim 1, wherein said safety device in the operating position extends horizontally outwardly of parts of said truck (1).

* * * * *